Figure 1:
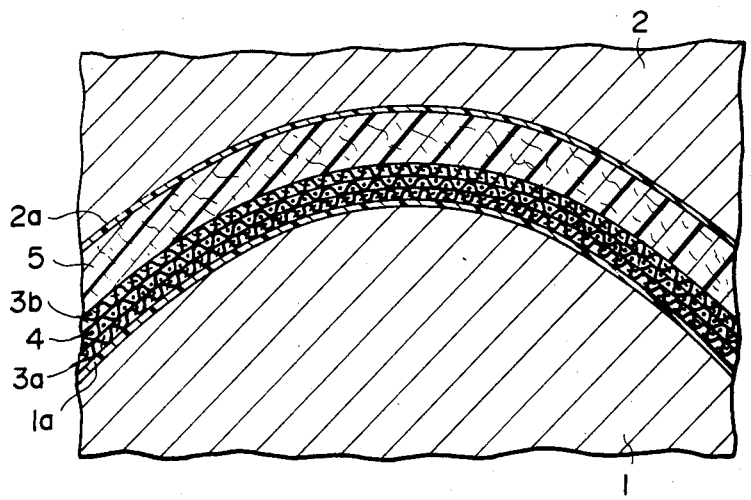

United States Patent [19]

Oono et al.

[11] Patent Number: 4,647,329
[45] Date of Patent: Mar. 3, 1987

[54] MANUFACTURE OF PARABOLIC ANTENNAS

[75] Inventors: Susumu Oono, Toyonaka; Mitsuru Kawata, Takasago, both of Japan

[73] Assignee: Toyo Kasei Kogyo Kabushiki Kaisha, Osaka, Japan

[21] Appl. No.: 650,735

[22] Filed: Sep. 14, 1984

[51] Int. Cl.⁴ .......................................... H01Q 15/16
[52] U.S. Cl. .................................... 156/245; 343/912
[58] Field of Search ................. 343/912, 840; 156/245

[56] References Cited

U.S. PATENT DOCUMENTS

| | | | |
|---|---|---|---|
| 2,747,180 | 5/1956 | Brucker | 343/912 |
| 2,948,896 | 8/1960 | Hart | 343/912 |
| 3,150,030 | 9/1964 | Mondano | 343/912 |
| 3,716,869 | 2/1973 | Gould et al. | 343/912 |
| 4,030,953 | 6/1977 | Rutschow et al. | 343/912 |
| 4,188,358 | 2/1980 | Withoos et al. | 343/912 |
| 4,242,686 | 12/1980 | MacTurk | 343/912 |

Primary Examiner—Eli Lieberman
Attorney, Agent, or Firm—Armstrong, Nikaido, Marmelstein & Kubovcik

[57] ABSTRACT

Plastic-made parabola antennas are improved to get more wave gain in the process of manufacture thereof where a wave reflector material is embedded in other molding materials so as not to cause dislocation thereof during thermoset-molding.

4 Claims, 2 Drawing Figures

MANUFACTURE OF PARABOLIC ANTENNAS

This invention relates to a parabolic antenna made of reinforced plastic and production of the same.

It has been proposed to manufacture parabolic antennas with reinforced plastics for their primary merits of superior resistance to corrosion and light weight, replacing conventional metal-made antennas which are manufactured by press and other metal processings with use of aluminum, steel or other metals. Manufacture of antennas with reinforced plastics involves processes where a material for an electric conductive reflector (hereinafter abbreviated as reflector), such as metal net, carbonfiber mat, is piled with other reinforcing and/or resineous materials, and is molded into an intended parabolic shape as a whole. However, undesirable problems involved therein are such that the reflector is not accurately configured to adequately define an exact geometrical parabola, because of uneven internal pressures occurring in the molding process in a mold. Further, partial breaks of the reflector material are liable to take place. In principle, a reflector is embedded or enclosed in reinforcing resineous materials and hardened during the manufacture where a built-in reflector should take an exact parabolic configuration to achieve superior focussing of waves toward the focus point of the antenna surface. Therefore, dislocation thereof from predetermined positions in a mold during the hardening of resineous materials including the reflector or possible breaks due to extreme uneven molding pressure should be prevented. Further re-adjustment of reflector position after molding is almost impossible to be effected, therefore it is an important task to develop a technique for molding without fear of dislocation, much less breaking of the reflector surface.

Making reference generally to molding of a parabolic antenna by the beforementioned process in more details with reference to drawings which will be explained hereinafter and which are attached herewith, the FIG. 1 shows a couple of a male mold, a female mold and laminated molding materials where the numeral 1 denotes the male mold to be positioned at the concave surface or front surface of the parabolic antenna and 2 denotes the female one to be oppositely positioned at the side of convex surface or rear surface of the parabolic antenna. In operation, manual works include application of a mold releaser on two coupling molds and making of gel coats as denoted by 1a and 2a. Thereafter a reflector material and other resineous materials are laminated or layered, conventionally without special precautions.

However, this invention employs the technique that a reflector material may not be layered in the middle portion of the molding pile, instead, this invention intends to place the reflector so as to be close to the concave surface side which is close to the surface of the male mold in the drawing.

In a further embodiment of procedures to effect the present invention, a male-side buffer material 3a is piled to laminate on the gel coat 1a, thereon the reflector material 4 and the female-side buffer material 3b are piled or laminated, thereto thermosetting liquid resins are applied to impregnate into the above said piled materials. Further thereon so called sheet molding compound (SMC), known to those in the art, or other molding compounds are additionally piled to the predetermined height which will be noted as support portions hereinlater. Then the coupling molds are closed to heat and to thermoset the whole molding compound.

When hand-layup method or sprayup method, known to those in the art, is employed with use of only the male mold 1, a buffer material 3b to be placed at the side of the convex surface may be omitted.

One of the features of the invention resides in the application of buffer sheet material in contact with the reflector material.

A reflector material noted above may be a metal net made of aluminum, steel or brass; cloth or mat made of carbonfiber; further a metallic bulk material comprising metal-coated chopped glass fibers and/or carbonblack may be used as electric conductive filler.

A buffer material in this invention may preferably be a cloth or mat made of glass fiber or cellulosic, or other organic fibers where unit weight or weight per unit area thereof is preferably in the range of 10 to 100 $g/m^2$. Above 100 $g/m^2$ or below 10 $g/m^2$ the buffer effect obtained becomes insufficient or scant.

As noted hereinbefore, sheet molding compounds (SMC) may be used which are known as molding materials derived from liquid thermosetting resin and glass fiber staple or mat, and likewise resin-impregnated or-prepregnated mats or cloths may be used which are known as molding materials prepared by impregnation of liquid resins or by the step of impregnation into fiber substrates followed by gelation.

Molding materials as mentioned above are referred to in the S. Oleesky and G. Mohr "Handbook of Reinforced Plastics of SPI", Reinhold Publishing, 1964.

This invention covers another aspect where a reflector material or a buffer material is impregnated or pre-pregnated prior to application or to lamination to molding in order that ease of internal friction and enhancement of compatability among molding materials may be further obtained in the molding process.

A liquid thermosetting resin to be used to the above impregnation and prepregnation is preferably selected from those which are equal or compatible to other molding materials. Examples thereof are; unsaturated polyester, epoxy, melamine, phenol and diallyl phthalate resins. Manners of the resin treatments noted above are known. Namely, prepregnation is effected by keeping impregnated cloths or mats under a suitable (temperature)×(time) condition, for instance, (40° C.–80° C.)×(1–7 hrs). An amount of prepregnated or impregnated resin is preferred to be 5 to 95% by resin pick up weight.

This invention is explained heretofore based on thermosetting type reinforcing resins, but support portions in the sectional view as denoted by 5 in the drawing may consist of a thermoplastic resin, in place of thermosetting. Suitable thermoplastic resins are, for instance, polyamide, polyethyleneterephthalate, polypropylene which will be molded by means of injection molding technique.

Making brief explanation of Drawings,

FIG. 1 shows a sectional view of base part of a mold in the act of molding a parabolic antenna wherein 1 denotes a male mold to define the concave surface or front surface of the antenna and 2 denotes a female mold to define the convex surface or rear surface of the antenna. 1a and 2a are gel coats. 4 is an electrically conductive reflector material made of, for instance, carbonfiber mat. 3a and 3b are sheet-form buffer materials which are placed to laminate on the reflector material 4 respectively. 5 is the support portion. It is to be noted that FIG. 1 is drawn with the curvature exaggerated.

Figure 2:
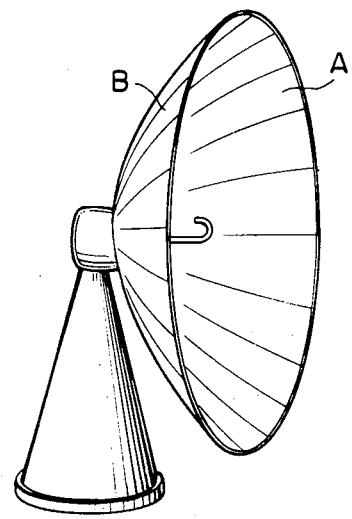

FIG. 2 shows a perspective view of a typical parabolic antenna. The mark (A) indicates the concave or front surface and (B) the convex or rear surface of the antenna.

EXAMPLE 1

A male mold having a parabolic shape was treated with a mold releaser and a gel coat was made with unsaturated polyester thereon. Further a glass fiber cloth having a unit weight of 100 g/m$^2$ as buffer and an aluminum net having 16 mesh openings (0.2 mm wire diameter) as reflector were piled in sequence. Then unsaturated polyester was applied to impregnate the pile. Thereafter a superstructure as support portion was built up by known hand layup method. Namely, glass fiber-choped stranded mats and roving cloths were piled in order while catalyst-incorporated unsaturated polyester liquid was applied thereto and puttied with roller and brush until the intended thickness of 4.5 to 5 mm was obtained. After hardening, a parabolic antenna 1.8 m in diameter was demolded and finished.

EXAMPLE 2

A couple of molds, male and female, were release-treated. Several SMC materials were piled in the female mold to have an intended thickness of 3 to 3.5 mm, thereon the first buffer, glassfiber mat having 30 g/m$^2$, a carbonfiber mat having 30 g/m$^2$ as a reflector and the second glassfiber mat having the same weight were piled in sequence. Thereafter the male mold was covered thereon to close and thermosetting was effected at 140° C. under 80 kg/cm$^2$ in pressure for 4 minutes, by which a parabolic antenna 1.0 m in diameter was molded.

EXAMPLE 3

An aluminum net having 16 mesh was used as reflector material in place of the material as noted in Example 2. The same operations were otherwise conducted and another antenna containing an aluminum reflector was manufactured.

EXAMPLE 4

In a male-female mold, glass fiber cloth as buffer and carbonfiber mat as reflector were piled. Into the closed mold, molten polypropylene was injected to make the support portion. A parabolic antenna 1 m in diameter was obtained.

COMPARATIVE EXAMPLES 1-4

In the above four (4) examples, buffer mats or cloths were omitted from molding preparations respectively. Antennas thus obtained are listed as examples 1-4 below.

Parabolic antennas obtained in the above examples and comparative ones were mounted with requisite trimming devices, such as, a horn, a waveguide and a converter. Wave receiving tests were conducted to measure wave gains of respective antennas under conditions that the distance the transmitting point was set at 200 m for 1.8 m antennas and 1000 m for 1.0 m antennas. Results are shown in Table 1.

TABLE 1

| | reflector | buffer | antenna diameter | wave (GHZ) | gain (dB) |
|---|---|---|---|---|---|
| Example 1 | Al net | glass cloth | 1.8 | 4 | 35.0 |
| Comparative 1 | Al net | none | | | 33.5 |
| Example 2 | CF mat | glass mat | 1.0 | 12 | 40.2 |
| Comparative 2 | CF mat | none | | | 38.5 |
| example 3 | Al net | glass mat | 1.0 | 12 | 40.4 |
| Comparative 3 | Al net | none | | | 38.6 |
| Example 4 | CF mat | glass cloth | 1.0 | 12 | 39.8 |
| Comparative 4 | CF mat | none | | | 38.0 |

Results in Table 1 prove that provision of the buffer material beside the reflector material contributes to superior performance of resultant antenna over difference in process of manufacture and in sort of reflector material.

EXAMPLE 5

A carbonfiber mat having 30 g/m$^2$ was dipped in unsaturated polyester liquid and squeezed by a roller to remove an excess liquid resin. Then the mat was prepregnated in an oven at 60° C. while the mat was put for 3 hrs on a curved prototype mold so as to take on the mold curvature. The amount of resin pick-up was 50 weight %.

The mold-shaped prepregnated mat was placed on a male mold and thereon a subsequent superstructure was laminated by sprayup method with glassfiber mat and unsaturated polyester up to 3 mm thickness. Then a parabolic antenna 1.0 m in diameter was manufactured by routine procedures.

EXAMPLE 6

The prepregnated carbonfiber mat as prepared in Example 5 was included in other SMC molding materials and a parabolic antenna 1.0 m in diameter was manufactured.

EXAMPLE 7

The prepregnation liquid as used in Example 5 was replaced from unsaturated polyester to melamine resin. Manufacturing operations were otherwise conducted in the same manner and the same sized parabolic antenna was obtained.

EXAMPLE 8

The carbonfiber mat as used in Example 5 was replaced by brass net having 50 mesh (0.12 mm wire diameter). Manufacturing operations were otherwise conducted in the same manner and the same sized parabolic antenna was obtained.

COMPARATIVE EXAMPLES 5-8

In the foregoing four (4) examples, buffer mats were omitted from molding preparations respectively. Antennas thus obtained are listed as examples 5-8 below.

Parabolic antennas obtained in the examples 5-8 and comparative ones 5-8 were mounted with requisite trimming devices in the same manner as hereinbefore. Wave receiving tests were conducted to measure wave gains of respective antennas under conditions that the distance is 1000 m and wave is 12 GHZ.

TABLE 2

|  | reflector | prepregnation resin | molding | wave gain |
|---|---|---|---|---|
| Example 5 | Carbon mat | unsaturated polyester | spray up | 39.4 |
| Compara. 5 |  | polyester |  | 37.5 |
| Example 6 | carbon mat | melamine | sheet molding | 40.0 |
| Example 7 | carbon mat | unsat. polyester | spray up | 39.5 |
| Example 8 | brass net | unsaturated polyester | spray up | 39.5 |
| Compara. 8 |  |  |  | 37.7 |

Results in Table 2 prove that the same advantage was attained as shown in Table 1.

EXAMPLE 9

A glassfiber mat having 30 g/m² unit weight was dipped to impregnation with unsaturated polyester liquid which had beforehand prepared to have a desired color. Then an excess liquid resin was removed by a roller and the impregnated glassfiber mat was put for prepregnation in an oven (60° C.) for 8 hrs. while the glassfiber mat was placed on a curved mold so as to take on the mold curveture. The amount of resin pick-up was 50 weight %.

On a mold for SMC molding use, the above-prepared prepregnated mat as the first buffer, carbonfiber mat (not impregnated or prepregnated) having 30 g/m² as reflector and the same prepregnated mat as before as the second buffer were piled in sequence. Then the mold was closed and the whole molding materials were thermoset at 140° C. under 80 kg/cm² for 4 minutes. Thus a parabolic antenna 1.0 m in diameter was manufactured. Wave receiving test thereof proved to have 40.0 dB gain.

EXAMPLE 10

A glassfiber cloth having 100 g/m² was prepregnated for use as buffer in the same manner as in the foregoing example. And a parabolic antenna 1.0 m in diameter was manufactured by routine SMC method. This antenna proved to have 39.9 dB gain.

EXAMPLE 11

A glassfiber mat having 30 g/m² was subject to impregnation in the same manner as in example 9. An antenna was molded with the use of the above prepregnated mat at the over-side of the reflector in the pile according to routine SMC method. A parabolic antenna 1.0 m in diameter thus manufactured proved to have 40.0 dB gain.

EXAMPLE 12

A glassfiber cloth was used to replace the mat in the foregoing. A parabolic antenna 1.0 m in diameter as manufactured in the same manner proved to have 39.9 dB gain.

We claim:

1. A process for manufacturing a plastic-made parabolic antenna including an electrically conductive reflector therein comprising the steps of:
   applying to a male mold, shaped to form a parabolic interior surface of said antenna, a first thermosetting gel coat;
   layering upon said first gel coat a first layer of buffer material impregnated with liquid thermosetting resin;
   layering upon said first layer of buffer material a reflective lamination layer made of a reflective net and a conductive filler of metallic bulk material comprising metal-coated chopped glass fiber material impregnated prior to layering with a liquid thermosetting resin;
   layering upon said reflective lamination layer a second layer of buffer material impregnated with liquid thermosetting resin;
   layering upon said second layer of buffer material a layer of thermosetting sheet molding material;
   covering said mold with a mating female mold having a second thermosetting gel coat applied thereto; and
   heating said molds under pressure to thereby harden said thermosetting materials and laminate them together.

2. The process according to claim 1, wherein said buffer material is made of a material selected from the group consisting of glass fibers, cellulosic fibers and other organic fibers, and wherein the unit weight thereof is in the range of 10 to 100 grams per square meter.

3. The process according to claim 1 wherein the liquid thermosetting resin is selected from the group consisting of unsaturated polyester resin, epoxy resin, melamine resin, phenol resin, and diallyl phthalate resin.

4. The process according to claim 1, wherein said step of layering said reflective lamination layer further includes inpregnating said layer with a liquid thermosetting resin selected from the group consisting of unsaturated polyester resin, epoxy resin, melamine resin, phenol resin, and diallyl phthalate resin, and molding it to a parabolic curvature.

* * * * *